United States Patent
Yi et al.

(10) Patent No.: US 8,787,826 B2
(45) Date of Patent: Jul. 22, 2014

(54) APPARATUS AND METHOD OF ACCESSING TO NETWORK IN WIRELESS COMMUNICATION

(75) Inventors: Seung June Yi, Anyang-si (KR); Sung Duck Chun, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 288 days.

(21) Appl. No.: 12/766,627

(22) Filed: Apr. 23, 2010

(65) Prior Publication Data

US 2010/0273416 A1   Oct. 28, 2010

Related U.S. Application Data

(60) Provisional application No. 61/172,702, filed on Apr. 24, 2009.

(30) Foreign Application Priority Data

Apr. 20, 2010   (KR) .......................... 10-2010-0036468

(51) Int. Cl.
*H04B 7/15* (2006.01)

(52) U.S. Cl.
USPC .......................................... 455/11.1; 455/434

(58) Field of Classification Search
USPC ............................................. 455/7, 11.1, 13.1
See application file for complete search history.

(56) References Cited

U.S. PATENT DOCUMENTS

| | | |
|---|---|---|
| 8,009,630 B2 * | 8/2011 | Boariu et al. ................. 370/331 |
| 2008/0043712 A1 | 2/2008 | Hart et al. |
| 2008/0107073 A1 | 5/2008 | Hart et al. |
| 2008/0207193 A1 | 8/2008 | Oh et al. |
| 2008/0219275 A1 | 9/2008 | Boariu et al. |

FOREIGN PATENT DOCUMENTS

| | | |
|---|---|---|
| CN | 101291527 A | 10/2008 |
| WO | 2008/051037 A1 | 5/2008 |

* cited by examiner

*Primary Examiner* — Tu X Nguyen
(74) *Attorney, Agent, or Firm* — Mckenna Long & Aldridge LLP

(57) ABSTRACT

A method and apparatus of accessing to a network node in a wireless communication system is provided. A relay node (RN) determines whether an access to a network node is allowable. The RN attempts to access to the network node if it is determined that the access to the network node is allowable. Service delay due to access failure can be prevented.

12 Claims, 13 Drawing Sheets

_US 8,787,826 B2_

APPARATUS AND METHOD OF ACCESSING TO NETWORK IN WIRELESS COMMUNICATION

CROSS-REFERENCE TO RELATED APPLICATIONS

This application claims the benefit of priority of U.S. Provisional application 61/172,702 filed on Apr. 24, 2009, and Korean Patent Application No. 10-2010-0036468 filed on Apr. 20, 2010, all of which are incorporated by reference in their entirety herein.

BACKGROUND OF THE INVENTION

1. Field of the Invention

The present invention relates to wireless communication, and more particularly, to an apparatus and method of accessing to a network of relay nodes in a wireless communication system.

2. Related Art

The 3rd generation partnership project (3GPP) long term evolution (LTE) which is a set of enhancements to the Universal Mobile Telecommunications System (UMTS) have been introduced as 3GPP release 8. The 3GPP LTE uses an orthogonal frequency division multiple access (OFDMA) in a downlink and uses a single carrier-frequency division multiple access (SC-FDMA) in an uplink. The 3GPP LTE adopts multiple input multiple output (MIMO) having maximum four antennas. Research is now underway on 3GPP LTE-Advanced (LTE-A), which is a major enhancement to 3GPP LTE.

As a representative technology newly added in the LTE-A system, there are carrier aggregation and a relay. The carrier aggregation is used to flexibly expand an available bandwidth. The relay increases coverage of a cell, supports group mobility, and allows a user-centered network arrangement.

A relay node, which is a sort of network node, needs first to access to other network nodes (base stations or other relays) and then, to activate network functions in order to manage user equipments.

However, when receiving an access request from the relay mode, a base station does not unconditionally allow the access request but determines whether or not allow the access request of the relay node under considering various conditions. For example, when the base station does not support network configuration or has no sufficient radio resources supporting the relay node, the base station does not allow the access request of the relay node. After the access request is rejected, the relay node retries the access request with other base station.

The access attempt to the network node that does not allow the access of the relay node may unnecessarily delay services. When the relay node supports the group mobility, the elay due to the unnecessary access attempt may significantly degrade quality of service provided to user equipments managed by the relay node.

There is a need for preventing the access delay of the relay node.

SUMMARY OF THE INVENTION

The present invention provides a method and apparatus of accessing to a network node in a wireless communication system.

In an aspect, a method of accessing to a network node in a wireless communication system is provided. The method includes receiving, by a relay node (RN), a relay node allow indicator (RNAI) from a network node, the RNAI indicating whether an access to the network node is allowable, determining, by the RN, whether the access to the network node is allowable based on the RNAI, and attempting, by the RN, to access to the network node if it is determined that the access to the network node is allowable.

The RNAI may be received through system information.

The method may further include receiving a network node indicator (NNI) from the network node, the NNI indicating whether the network node is a relay node or a base station.

Whether the access to the network node is allowable is determined based on the RNAI and the NNI.

The method may further include requesting transmission of a node list which includes the RNAI of the network node.

In another aspect, a method of accessing to a network node in a wireless communication system is provided. The method includes determining, by a relay node (RN), whether an access to a network node is allowable, and attempting, by the RN, to access to the network node if it is determined that the access to the network node is allowable.

Whether the access to the network node is allowable may be determined based on a node list which contains a list of at least one network node which allows the access of the RN.

The method may further include receiving, by the RN, a relay node allow indicator (RNAI) from the network node, the RNAI indicating whether the access of the RN is allowable, and whether the access to the network node is allowable may be determined based on the RNAI.

In still another aspect, a relay node in a wireless communication system includes a radio frequency (RF) unit configured to transmit and receive radio signals, and a processor operatively coupled with the RF unit and configured to determine whether an access to a network node is allowable, and attempt to access to the network node if it is determined that the access to the network node is allowable.

It can prevent delay due to access fail to a network of a relay node (RN). Therefore, the RN can be stably operated between the user equipment and the base station, thereby making it possible to prevent the service delay.

DESCRIPTION OF EXEMPLARY EMBODIMENTS

Figure 1:
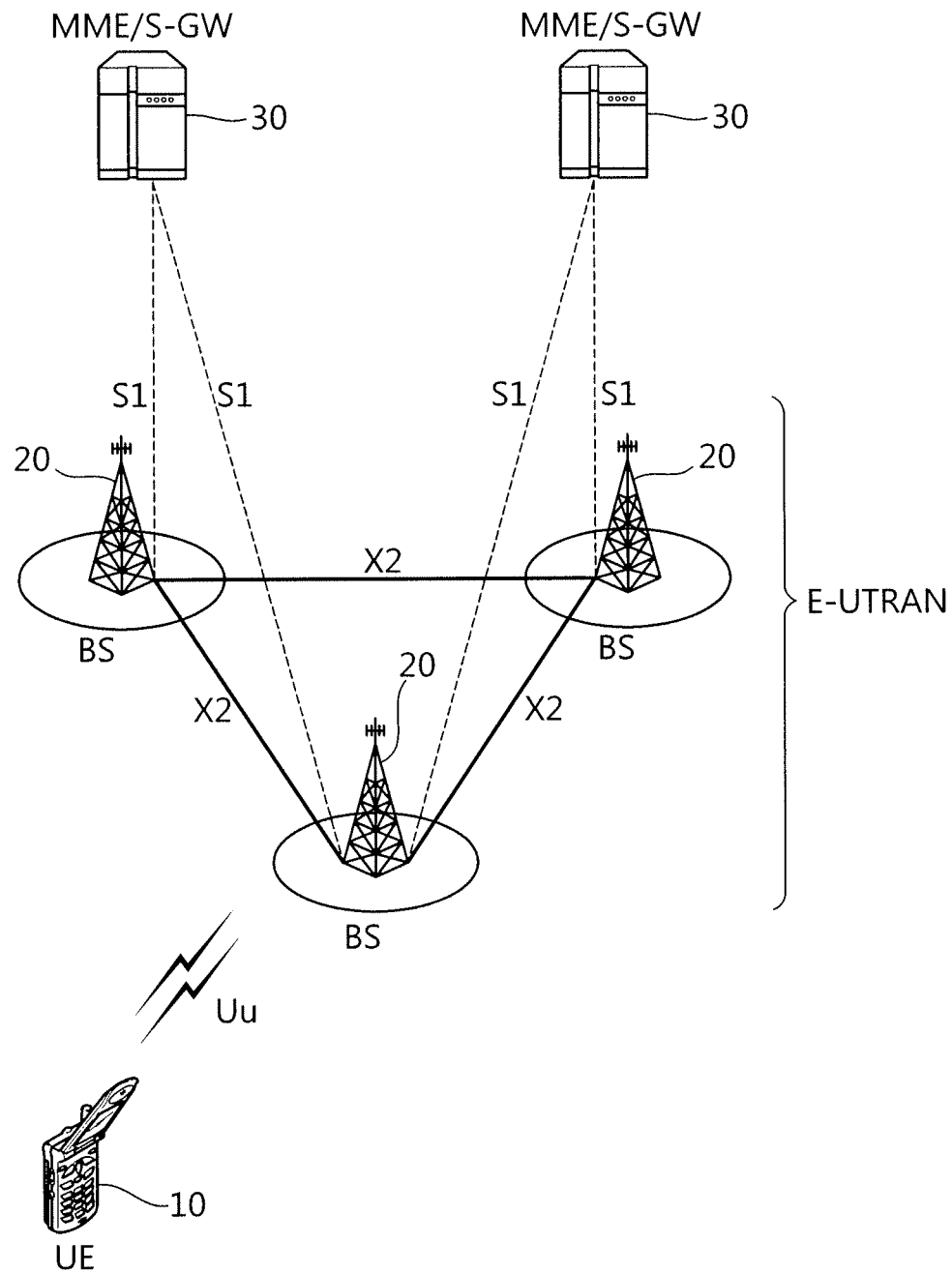
FIG. 1 is a diagram showing a wireless communication system to which the present Invention is applied.

FIG. 1 is a diagram showing a wireless communication system to which the present invention is applied. This can be called an Evolved-UMTS Terrestrial Radio Access Network (E-UTRAN) or a Long Term Evolution (LTE)/LTE-A system.

The E-UTRAN includes base stations (BSs) 20 that provide a control plane and a user plane to user equipment (UE) 10. The UE 10 may be fixed or moved and may be called as other terms such as a mobile station (MS), a user terminal (UT), a subscriber station (SS), a mobile terminal (MT), a wireless device, etc. The BS 20 means a fixed station that communicates with the UE 10 and may be called as other terms such as an evolved-NodeB (Enb), a base transceiver system (BTS), an access point, etc.

The BSs 20 are interconnected with each other by means of an X2 interface. The BSs 20 are also connected by means of the S1 interface to the EPC (Evolved Packet Core), more specifically to the MME (Mobility Management Entity) by means of the S1-MME and to the Serving Gateway (S-GW) by means of the S1-U.

The EPC 30 is configured to include the MME, the S-GW, and a packet data network-gateway (P-GW). The MME has access information on the UE or information on the capability of the UE. This information is mainly used for the mobility management of the UE. The S-GW is a gateway having E-UTRAN as an endpoint and the P-GW is a gateway having the PDN as an endpoint.

A radio interface between the UE and the BS is called a Uu interface. Layers of a radio interface protocol between the user equipment and the network may be divided into an L1 (first layer), an L2 (second layer), and an L3 (third layer) based on three lower layers of an open system interconnection (OSI) standard model that is widely known in a communication system. A physical layer belonging to the first layer provides an information transfer service using a physical channel and a radio resource control (RRC) layer belonging to the third layer serves to control radio resources between the user equipment and the network. To this end, the RRC layer exchanges the RRC messages between the user equipment and the base stations.

Figure 2:
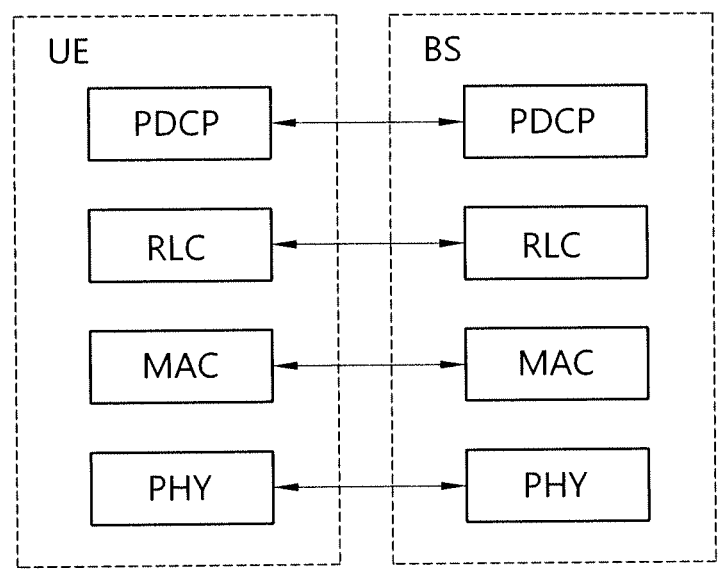
FIG. 2 is a block diagram showing radio protocol architecture for a user plane.
Figure 3:
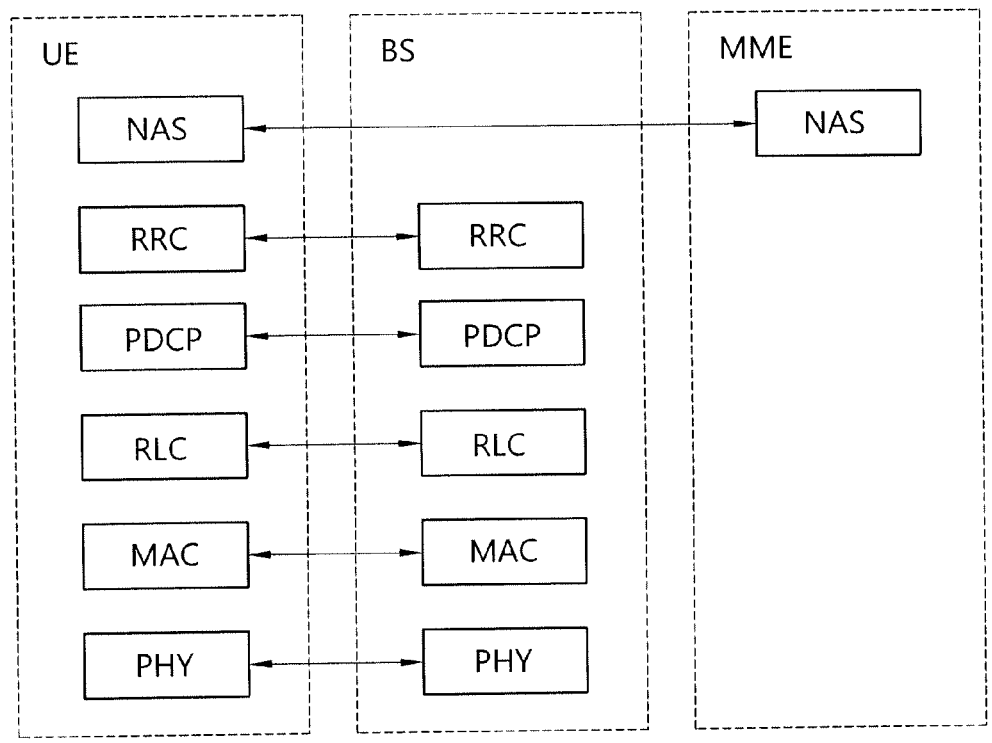
FIG. 3 is a block diagram showing radio protocol architecture for a control plane.

FIG. 2 is a block diagram showing radio protocol architecture for a user plane. FIG. 3 is a block diagram showing radio protocol architecture for a control plane. The data plane is a protocol stack for transmitting user data and the control plane is a protocol stack for transmitting the control signal.

Referring to FIGS. 2 and 3, the physical (PHY) layer provides the information transfer service to an upper layer using the physical channel. The PHY layer is connected with the upper layer, i.e. a medium access control (MAC) layer, through a transport channel. Data are exchanged between the MAC layer and the physical layer through the transport channel. Transport channels are classified by how and with what characteristics data are transferred over the radio interface.

Between different physical layers, i.e., the physical layer of a transmitter and the physical layer of a receiver, data are transferred through the physical channel. The physical channel may be modulated by using an orthogonal frequency division multiplexing (OFDM) scheme and may use time and frequency as radio resources.

The functions of the MAC layer include the mapping between logical channels and transport channels, and the multiplexing/demultiplexing of MAC service data units (SDUs) belonging to one or different logical channels into/from transport blocks delivered to/from the PHY layer on the transport channels. The MAC layer provides services to a radio link control (RLC) layer through the logical channel.

The functions of the RLC layer include concatenation, segmentation, and reassembly of RLC SDUs. In order to guarantee various quality of services (QoSs) required by radio bearers (RBs), the RLC layer provides three operation modes: a transparent mode (TM), a unacknowledged mode (UM), and an acknowledged mode (AM). The AM RLC provides error correction through an automatic repeat request (ARQ).

The functions of the packet data convergence protocol (PDCP) layer at the user plane include transfer of user data, header compression/decompression, and ciphering/deciphering. The functions of the packet data convergence protocol (PDCP) layer at the control plane include transfer of control plane data, and ciphering and integrity protection.

A radio resource control (RRC) layer is defined only in the control plane. The RRC layer serves to control the logical channels, the transport channels and the physical channels in association with configuration, reconfiguration and release of radio bearers (RBs).

The RB means a logical path provided by the first layer (i.e. PHY layer) and the second layers (i.e. MAC layer, RLC layer, PDCP layer) for data transmission between a UE and a network. Configuring the RB means a process of defining radio protocol layers and characteristics of channels to provide a service and defining specific parameters and operation schemes. The RB may be classified into a signaling RB (SRB) and a data RB (DRB). The SRB is used as a path to transfer RRC messages at the control plane and the DRB is used as a path to transfer the user data at the user plane.

A non-access stratum (NAS) layer belonging to the upper layer of the RRC layer serves to perform session management and mobility management.

When RRC connection is made between the RRC layer of the UE and the RRC layer of the E-UTRAN, the UE is in an RRC connected state. Otherwise, the UE is in an RRC idle state.

Figure 4:
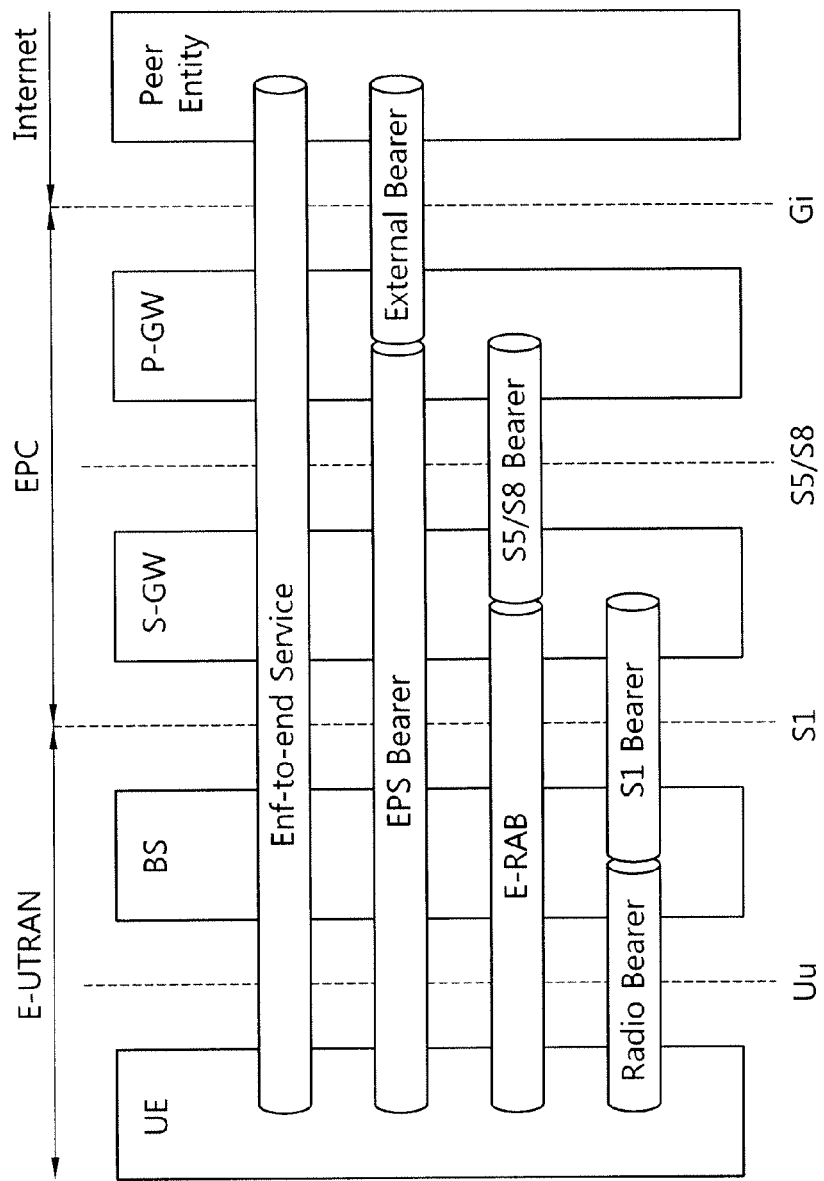
FIG. 4 is a diagram showing architecture of a bearer service in 3GPP LTE.

FIG. 4 is a diagram showing architecture of a bearer service in 3GPP LTE. The RB is a bearer provided via an Uu interface in order to support the user services. In the 3GPP LTE, each bearer is defined for each interface in order to guarantee independence between the interfaces.

The bearers provided by the 3GPP LTE system is generally called as evolved packet system (EPS) bearers. The EPS bearers are divided into the radio bearer (RB), the S1 bearer, etc. for each interface.

The packet gateway (P-GW) is a network node that connects between the LTE network and other networks. The EPS bearer is defined between a UE and the P-GW. The EPS bearer is more subdivided between respective nodes, such that it is defined as the RB between a UE and a BS, as the S1 bearer between the BS and the S-GW, and as the S5/S8 bearer between the S-GW and the P-GW within the EPC. Each RB can defined by quality of service (QoS). The QoS may be defined using data rate, error rate, delay, etc.

After the EPS bearer is defined by overall QoS to be provided by the LTE system, each interface is defined by its own QoS. Each interface configures at least one bearer to guarantee the QoS provided by the interfaces.

Since the overall QoS of the EPS bearer is provided by all the bearers of each interface, all the EPS bearers, the RBs, the S1 bearers, etc. are in one-to-one correspondence respectively.

The long term evolution-advanced (LTE-A) system is a system developed to meet the LTE system to fourth-generation mobile communication conditions which is IMT-Advanced conditions recommended in an international telecommunication union-radio communication sector (ITU-R). In the 3GPP developing the LTE system standard, the LTE-A system standard development is now in progress.

As a representative technology newly added in the LTE-A system, there are carrier aggregation and a relay. The carrier aggregation is used to flexibly expand an available bandwidth. The relay increases the coverage of a cell, supports the group mobility, and allows a user-centered network arrangement.

Figure 5:
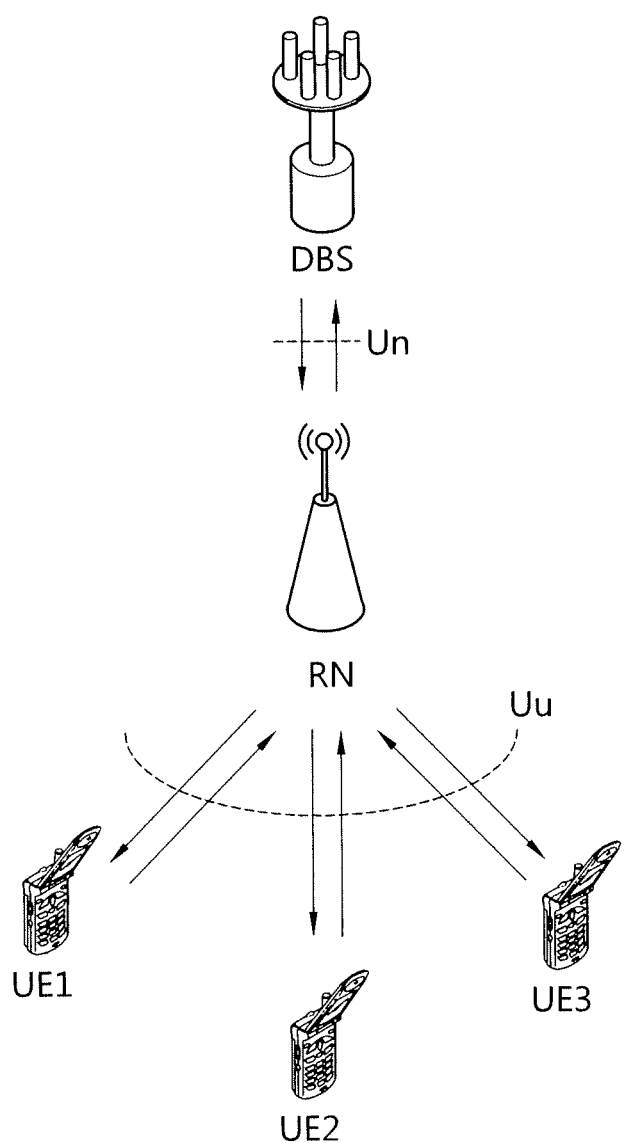
FIG. 5 is a diagram showing a network system supporting the relay.

FIG. 5 is a diagram showing a network system supporting the relay. The relay relays data between the UE and the BS. A network node that performs functions of the relay is called as a relay node (RN). The BS that manages one or more RN is called a donor BS (DBS).

The radio interface between the UE and the RN is called a Uu interface and the radio interface between the RN and the DBS is called a Un interface. A link between the UE and the RN is called an access link, and a link between the RN and the DBS is called a backhaul link.

The RN manages the UE on behalf of the DBS. The UE can transparently receive services from the DBS through the RN. This means that it is not necessarily for the UE to know whether services are provided by the DBS through the RN or whether services are directly provided by the DBS. Therefore, the Uu interface between the UE and the RN can utilize the Uu interface protocol used by the 3GPP LTE almost as it is.

In terms of the DBS, the RN can access to the DBS as a UE or a BS of the UE. For example, when the RN initially accesses to the DBS, the DBS does not know whether the RN attempts to access the DBS. Initially, the RN can attempt to access to the DBS through a conventional random access process, similar to other UEs. After the RN completes the access of the DBS, the RN is operated like the BS that manages the UE connected thereto.

Therefore, it is necessary that functions of Un interface protocol includes functions of the network protocol as well as functions of the Uu interface protocol. In the current 3GPP, whether any function in each protocol layer is added or changed based on the Uu interface protocol such as the MAC/RLC/PDCP/RRC layers for the Un interface protocol is under discussion.

The RN is a sort of network node. In order for the RN to manage the UE, the RN first accesses to other network nodes (i.e. BS or other RN) and then, activates network functions.

However, when the RN is initially not connected with other network node, the RN attempts the access to the network node through the conventional initial access procedure. In the 3GPP LTE, the initial access procedure is called a random access procedure.

The random access procedure can be classified into a contention based random procedure and a non-contention based random access procedure. The contention based random access procedure is initiated by allowing the UE or the RN attempting the access to the network to transmit a random access preamble randomly selected among a plurality of random access preambles to the BS by using randomly selected radio resources. Other UE can perform the random access with the same radio resource and the same random access preamble, which is called collision. On the other hand, the non-contention based random access procedure is initiated by allowing the UE or the RN to transmit a dedicated random access preamble to the BS.

Figure 6:
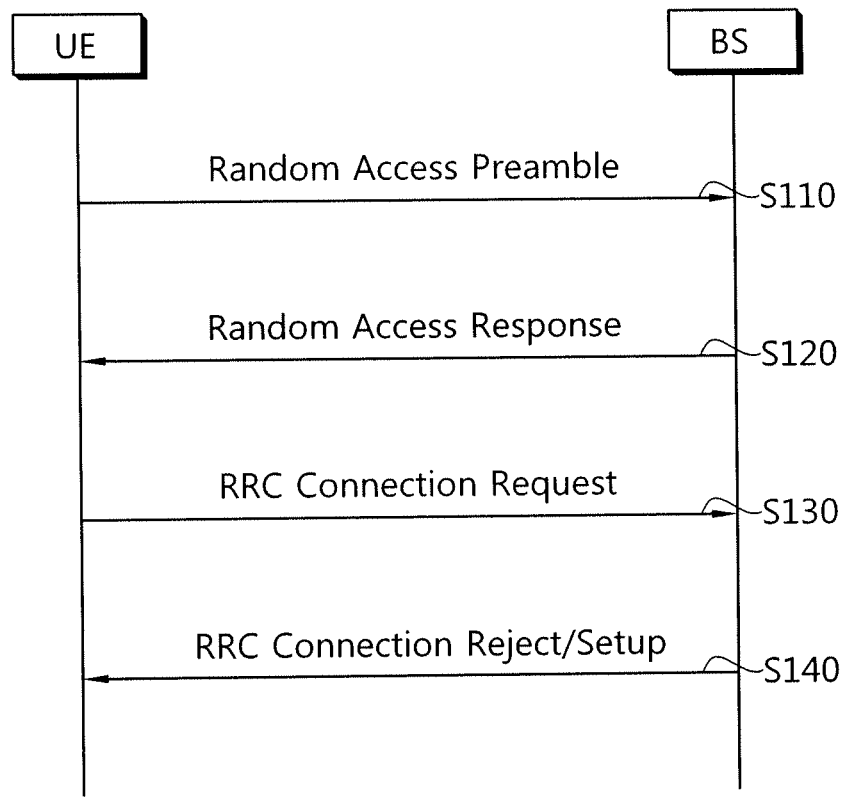
FIG. 6 is a flow chart showing a random access process in 3GPP LTE.

FIG. 6 is a flow chart showing a random access process in 3GPP LTE. This may refer to section 10.1.5 of 3GPP TS 36.300 V8.8.0 (2009-March).

To initiate an access request, a UE transmits a random access preamble randomly selected in a set of random access preambles to the BS by using a PRACH resource (S110). The set of the random access preambles may be generated using information obtained as system information.

When the BS receives the random access preamble from the UE, the BS transmits a random access response on a physical downlink shared channel (PDSCH) (S120). The random access response includes uplink time alignment, uplink resource allocation, random access preamble index, temporary cell-radio network temporary identifier (C-RNTI). The PDSCH of the random access response is indicated by a physical downlink control channel (PDCCH) of which cyclic redundancy check (CRC) is masked with a random access-radio network temporary identifier (RA-RNTI).

When the random access preamble index in the random access response corresponds to its own random access preamble, the UE transmits the RRC connection request on the UL-SCH by using the uplink radio resource allocation.

As a response to the RRC connection request, the BS may transmit the RRC connection reject or the RRC connection setup to the UE (S140).

Although this shows the random access procedure of the UE, the RN can also perform the random access procedure in the same manner.

When receiving a access request from the RN, the BS does not unconditionally allow access but determines whether or not allow the access of the RN according to the situations of the RN. For example, when the BS does not support the network configuration associated with the RN or has no the radio resources enough to support the RN, the BS may reject the access of the RN. After the access attempt to the BS fails, the RN needs to retry the initial access procedure to other BS.

The access attempt to the network nodes that does not allow the access of the RN can unnecessarily delay the services of the RN. When the RN supports the group mobility, delay due to the unnecessary access attempt may significantly degrade the quality of service to UEs.

Figure 7:
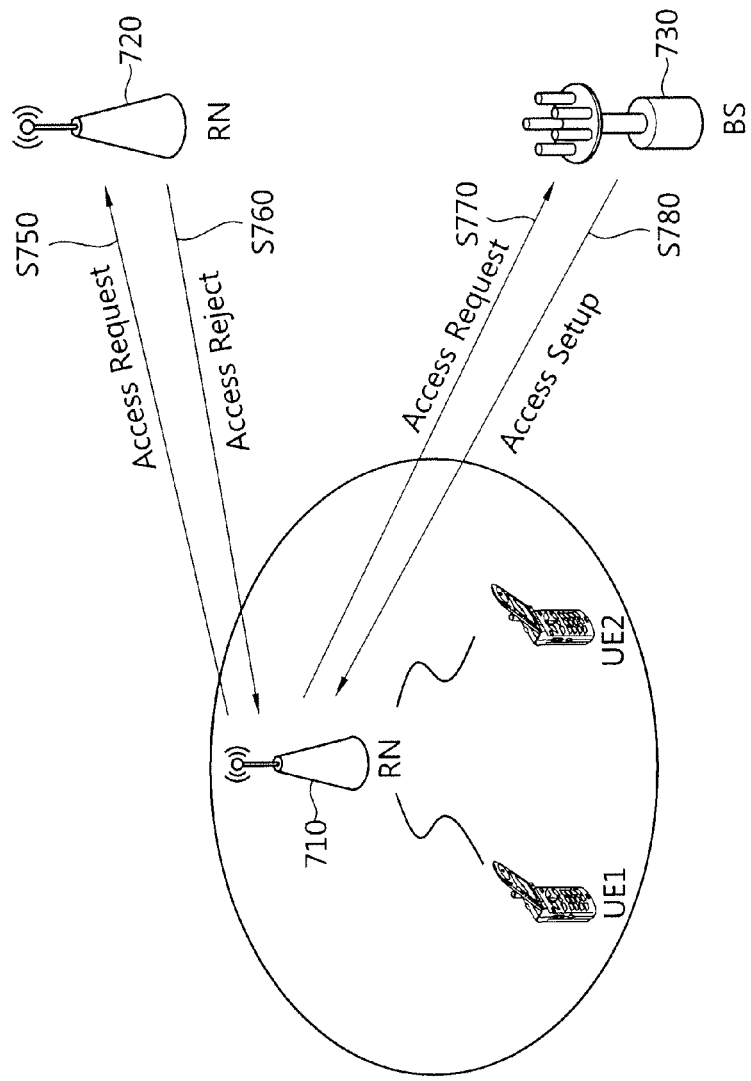
FIG. 7 is a diagram showing one example of access delay.

FIG. 7 is a diagram showing one example of access delay. An RN 710 that wants to access to a network node transmits the access request to another RN 720 (S750). The RN 710 does not know that the network node to be accessed by the RN 710 is an RN. The RN 720 that does not support a management of a relay rejects the access request of the RN 710 (S760).

Thereafter, the RN 710 transmits an access request to the BS 730 (S770). The BS 730 accepts the access request of the RN 710 and transmits the access setup (S780).

According to the proposed technique to solve the above problems, when a RN attempts to access to other network nodes, the RN attempts to access only the network node that can accept the access of the RN.

Hereinafter, a network node is an entity that can access by the UE and/or the RN through a radio interface. The network node may be a BS or a RN that can be accessed by other RN. The BS that can be accessed by a RN is called the DBS.

A network node such as a RN or a BS can inform a RN of a relay node allow indicator (RNAI) which indicates whether to allow the access of the RN.

The RNAI may be transmitted as a part of the system information. Alternatively, the RNAI may be transmitted through messages before the initial access procedure or during the initial access procedure. For example, the RNAI may be transmitted through a synchronization signal or a random access response.

The RNAI is information that indicates whether the RN can access to the network node. For example, when the RNAI is 'FALSE', it is assumed that the access of the RN does not allow, and when the RNAI is 'TRUE', the access of the RN is allowed.

The RN first receives the RNAI to determine whether to allow the access before the RN attempts to access to a network node. When the value of the RNAI of the first network node received is set to 'FALSE', the RN determines that the first network node does not allow the access of the RN and searches other cells. When the value of the RNAI of the second network node received is 'TRUE', the RN determines that the second network node can allow the access of the RN and attempts the access.

The RNAI may be transmitted through a cell-specific message. There may be one or more cells served by a network node. Different RNAIs may be configured between the plurality of cells in the network node.

In the specific cell, the RNAI is not constant at all times but the value of the RNAI may be changed depending on the change in condition of the network node.

The RNAI may be periodically transmitted. When the RNAI is changed, the RNAI may be set to the changed value at the beginning of next period.

The RNAI may be a flag of 1 bit having two values of TRUE/FALSE. Alternatively, the RN may indicate TRUE or FALSE by existence of the RNAI. For example, if the existence of the RANI transmission is detected, the value of the RNAI can be determined to be TRUE. If the existence of the transmission is not detected, the value of the RNAI can be determined to be FALSE.

Figure 8:
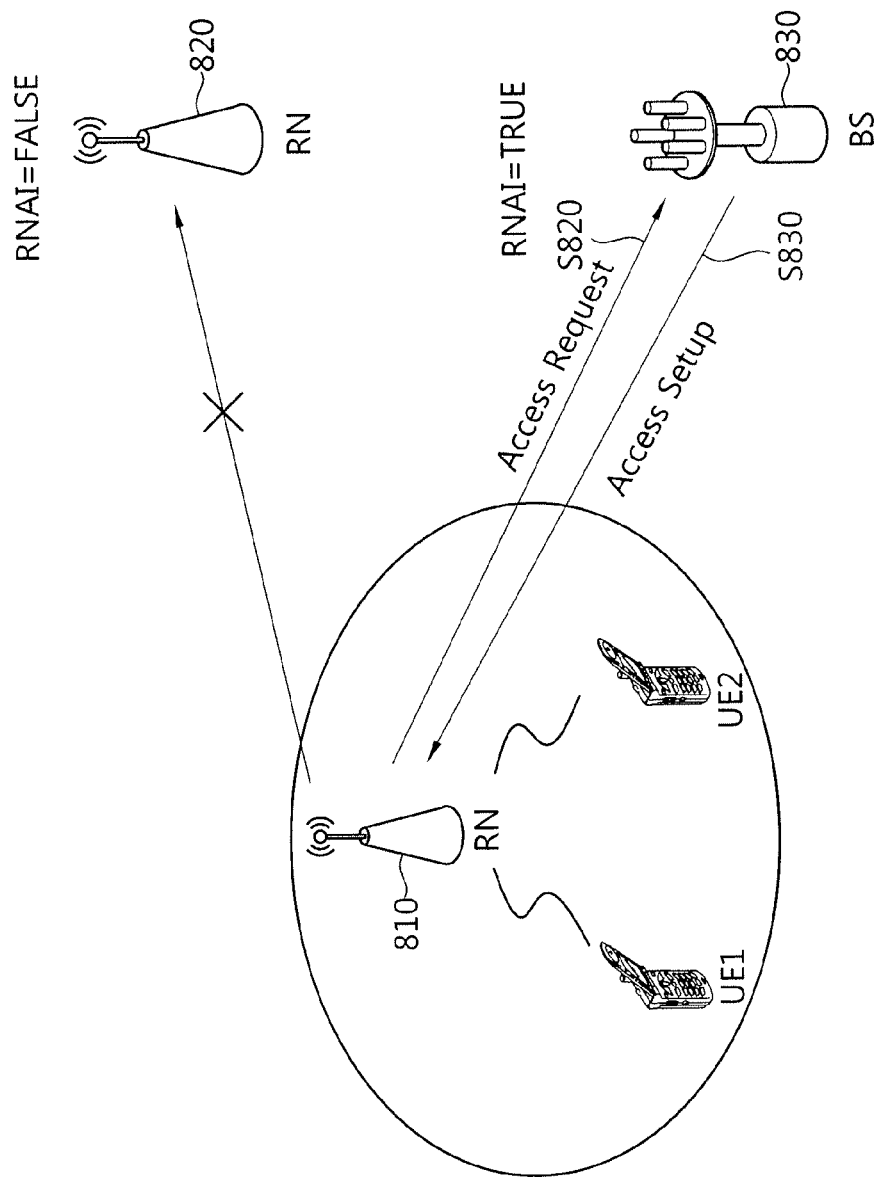
FIG. 8 shows an access method according to an exemplary embodiment of the present invention.

FIG. 8 shows an access method according to one exemplary embodiment of the present invention. A first network is called an RN 820 and a second network node is called a BS 830. It is assumed that the RNAI of the RN 820 is set to 'FALSE' and the RNAI of the BS 830 is set to 'TRUE'.

After a RN 810 receives the RNAI of the RN 820, the RN 810 knows that the RN 820 does not allow the access of the RN 819 and does not attempt the access to the RN 820.

After the RN 810 receives the RNAI of the BS 830, the RN 810 knows that the BS 830 allows the access of the RN 810 and transmits an access request to the BS 830 (S820). The access request may be initiated by transmitting a random access preamble or a RRC connection request to the BS 830.

When the BS 830 can accept the connection request of the RN 810, the BS 830 transmits an access setup vi a RRC connection setup message (S830).

The RN 810 can determine whether to allow the access of the RN prior to attempting an initial access such as the random access procedure, thereby making it possible to prevent unnecessary initial access attempt. As a result, service delay can be prevented.

Although it is shown that the RNAI is used for the initial access, the RNAI can be used for the group mobility in a connected state. In the connected state the RN 810 can search another cell while camping on a serving cell. The RN 810 can receives a RNAI for another cell and determine a cell having the RNAI of TRUE as a target cell. The RN 810 can report the target cell to the serving cell. Therefore, the RN 810 can report only accessible cells for cell reselection.

The RNAI can indicate the amount of resources available to the RN and/or a priority level of the RN. The RN compares the necessary amount of resources or the priority level with the value of the RNAI, and attempts the access to the network node only in the accessible case.

Figure 9:
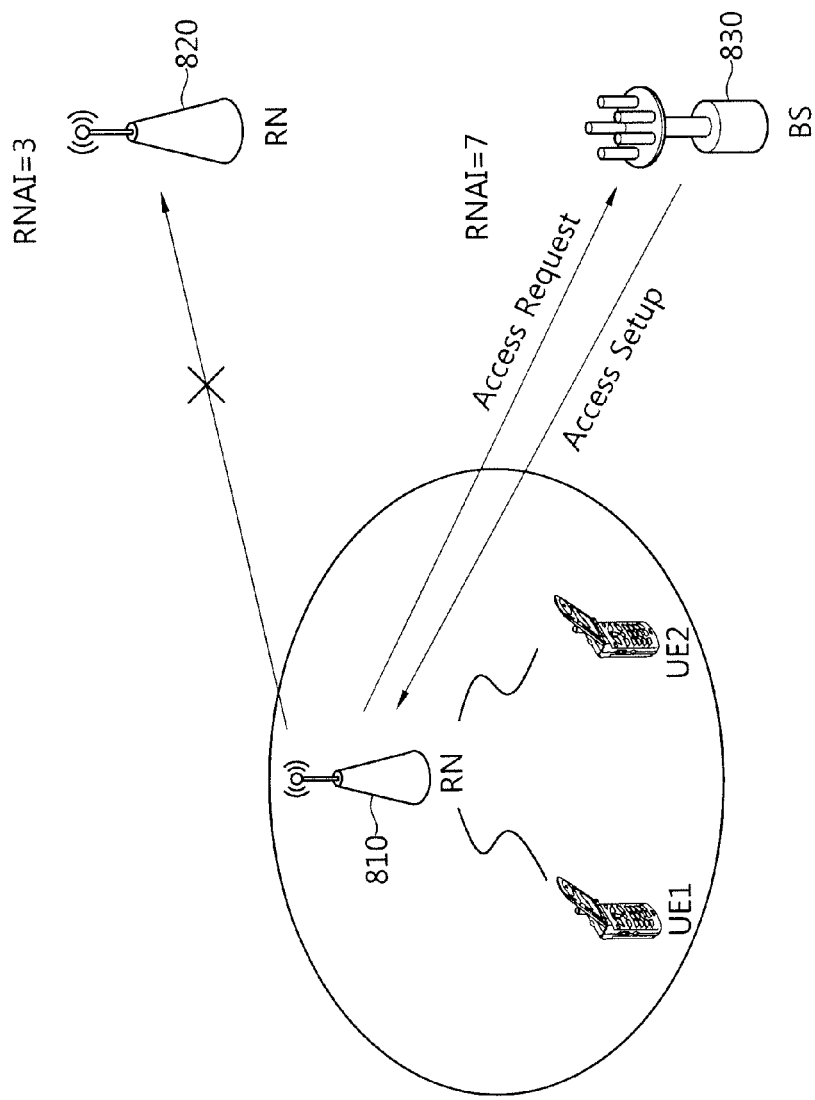
FIG. 9 shows an access method according to another exemplary embodiment of the present invention.

FIG. 9 shows an access method according to another exemplary embodiment of the present invention. It is assumed that a RNAI indicates a priority level and a network node accepts only the access of the RN having the priority level higher than that of the network node.

The priority level of a RN 810 which tries to access is 5. The RNAI of the RN 820 is set to 3and the RNAI of the BS 830 is set to 7. Therefore, the RN 810 receiving the RNAI of the RN 820 and/or the RNAI of the BS 830 attempts the access to the BS 830 having the priority level higher than that of the RN 810.

A multi-hop system where a RN may be a network node is described above. However, in a single-hop system where the RN cannot access to other RN and access only to a BS, the following method can be considered.

As one example, a BS transmits a BS indicator indicating the BS, and a RN transmits a RN indicator indicating the RN. The BS indicator and the RN indicator may be transmitted through the system information. The RN attempts the access when receiving the BS indicator, but the RN does not attempt the access when receiving the RN indicator.

As another example, a network node may transmit a network node indicator (NNI). The NNI is information indicating whether the network node is the BS or the RN. For example, when the value of the NNI is set to '0', it may indicate the BS, and when the value of the NNI is set to '1', it may indicate the RN.

Figure 10:
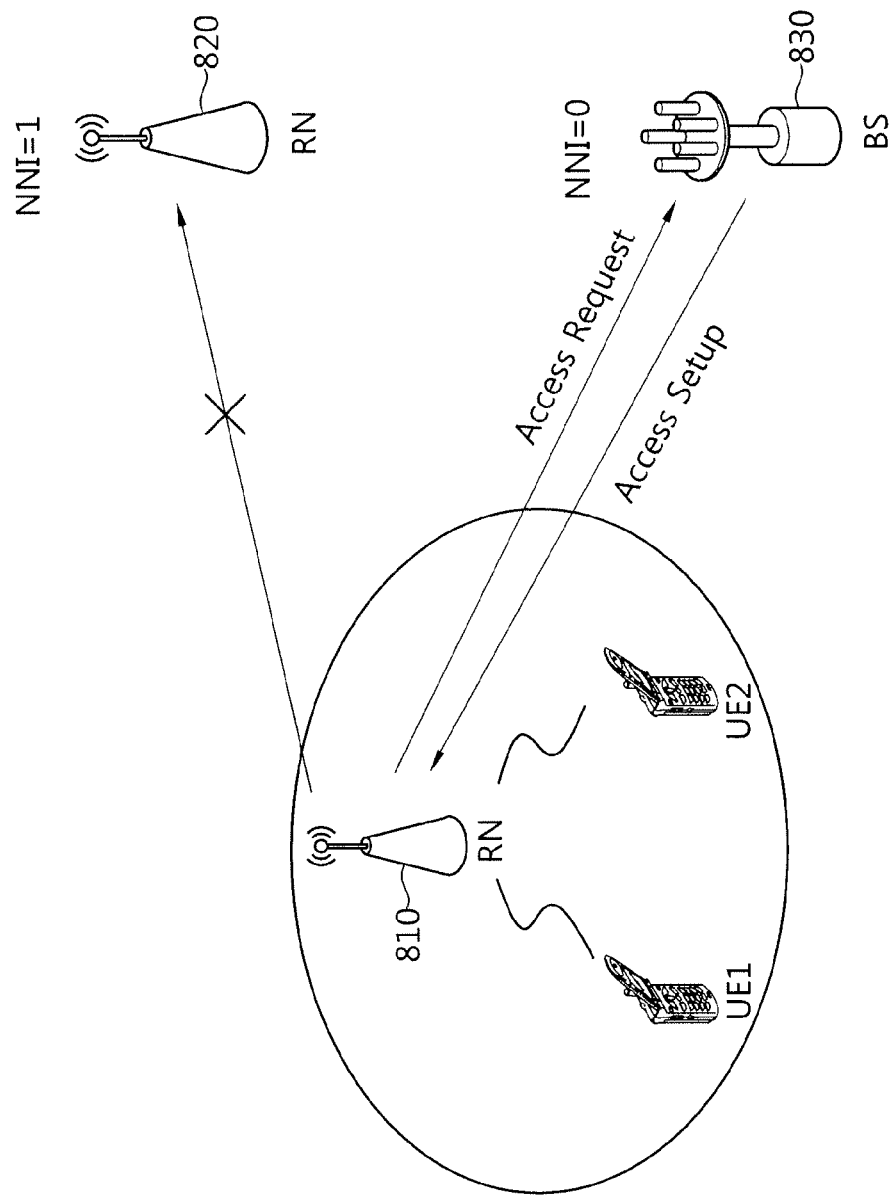
FIG. 10 shows an access method according to another exemplary embodiment of the present invention.

FIG. 10 shows an access method according to another exemplary embodiment of the present invention. A NNI of a RN 820 is set to 1 and a NNI of a BS 830 is set to 0. Therefore, a RN 810 receiving the NNI of the RN 820 and/or the NNI of the BS 830 attempts to access not to the RN 820 but to the BS 830.

The NNI can be used to select a network node to which a UE tries to access. Therefore, a RN or a UE can know whether the network node is the RN or the BS through the NNI and can select the preferred network node.

Meanwhile, since the NNI is information indicating a type of the network node, the NNI cannot be used to control the access of the RN when there is no assumption that the RN cannot access to other RNs. Therefore, the RNAI can be used with the NNI together when the RN can access to other RN.

Figure 11:
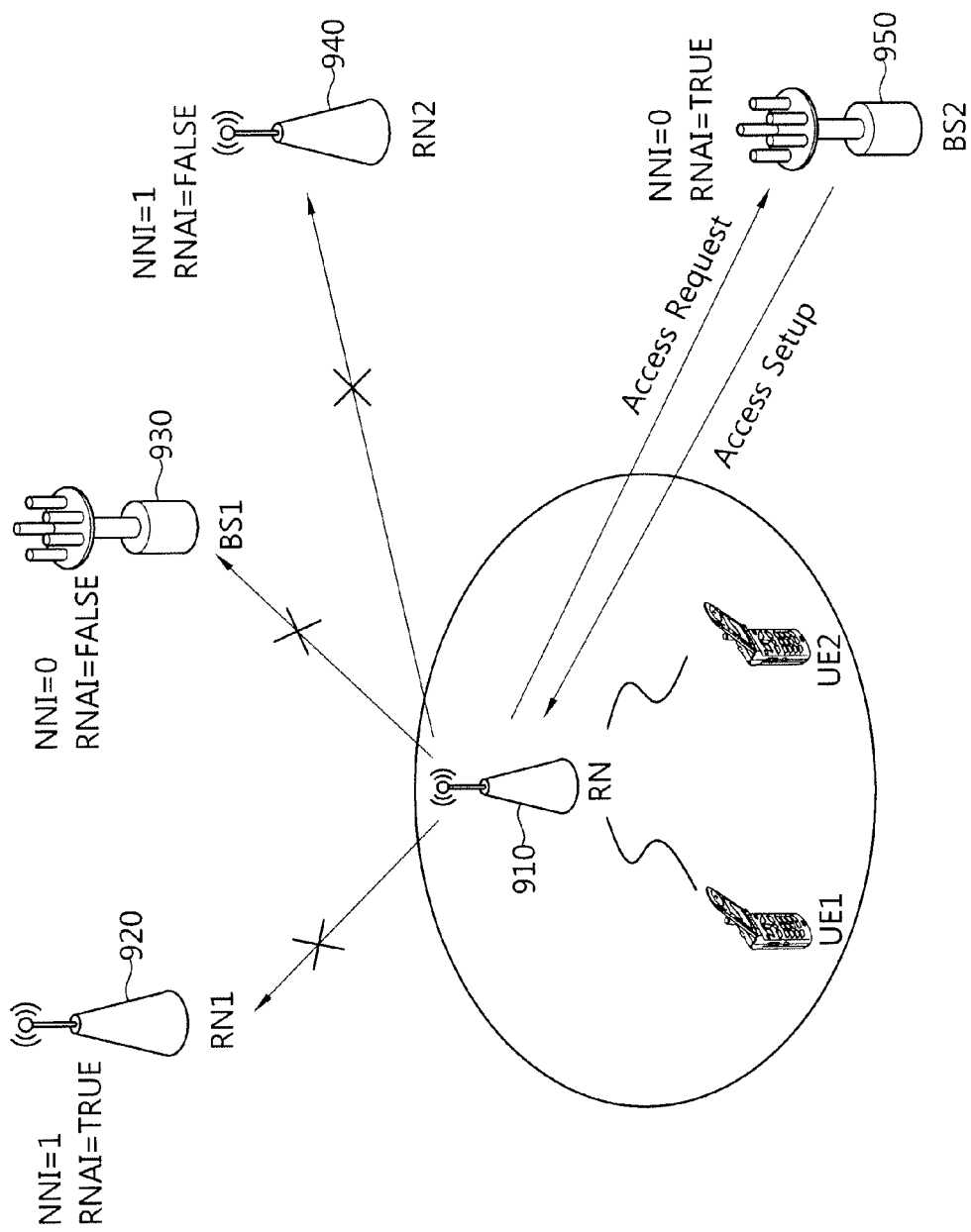
FIG. 11 shows an access method using an NNI and an RNAI.

FIG. 11 shows an access method using the NNI and the RNAI.

First, an RN 910 searches an RN1 920, an RN2 940, a BS1 930, and a BS2 950 as access targets. Since a RNAI of the BS 930 and a RN2 940 is set to 'FALSE', the RN 910 does not attempt the access.

The RN 910 determines that the RN1 920 and the BS2 950 are the access targets. Further, the RN 910 knows that the RN1 920 is the RN and the BS2 950 is the BS through the NNI. When it is assumed that the RN 910 prefers to access to the BS, the RN 910 attempts to access to the BS2 950.

When the RN 910 fails the access to the BS2 950, the RN 910 can attempt to access to the RN1 920.

Figure 12:
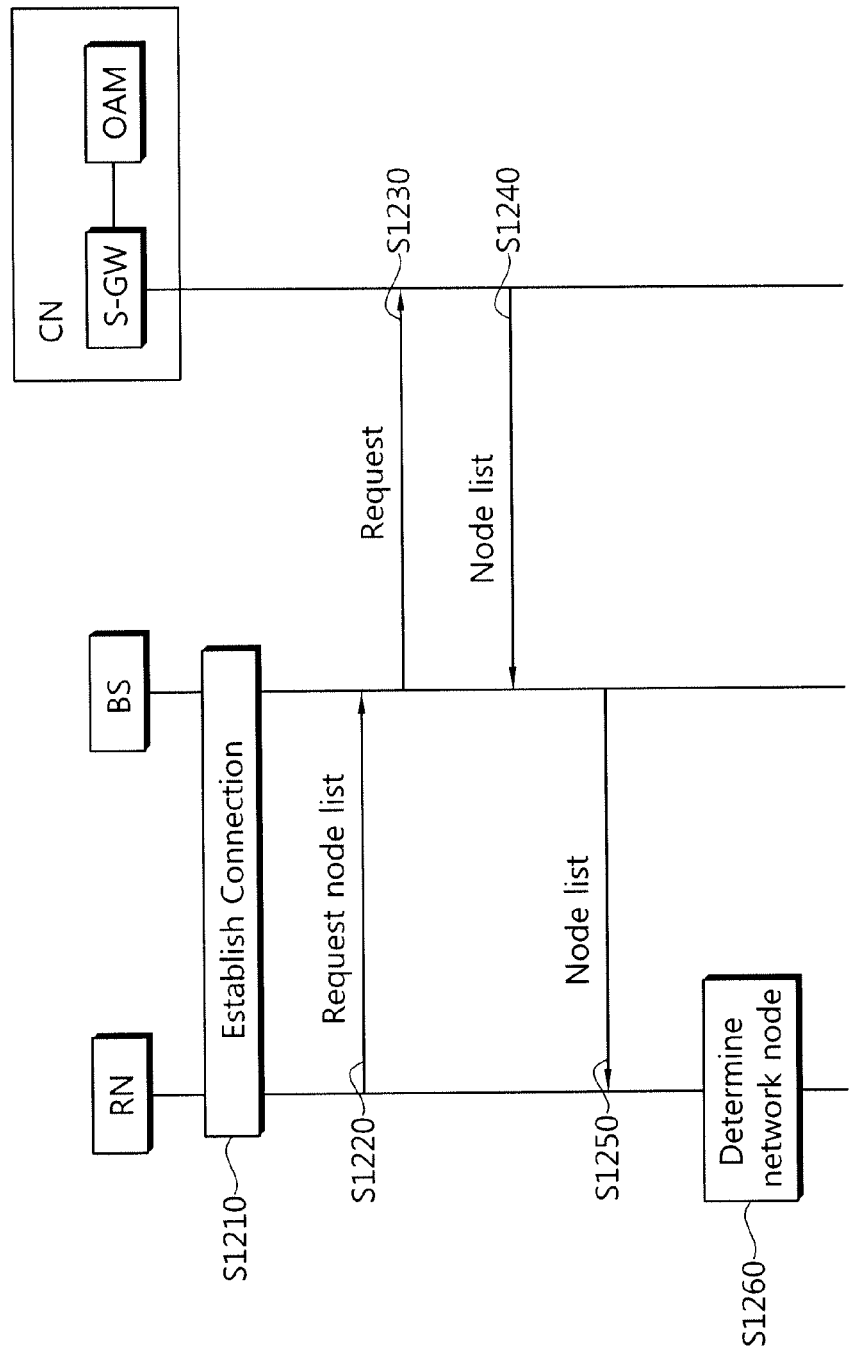
FIG. 12 shows an access method according to another exemplary embodiment of the present invention.

FIG. 12 shows an access method according to another exemplary embodiment of the present invention.

A connection between a RN and a BS is established (S1210). The RN and the BS perform the random access procedure, thereby making it possible to establish the RRC connection.

The RN requests a node list to the BS (S1220). The BS informs a S-GW of the core network (CN) of the request of the node list (S1230). The S-GW configures the node list by referring to operation and management (QAM) and transmits the node list to the BS (S1240). The BS transmits the node list to the RN (S1250).

The RN can determine the network node to be moved (or accessed) based on the node list (S1260).

The node list includes the RNAI and/or NNI for neighboring cells around the RN. One example of the node list is listed in the following Table.

TABLE 1

```
NodeList = {
    cell ID1 = { RNAI, NNI }
    cell ID2 = { RNAI, NNI }
    ...
}
```

The RN accesses to the network node as a UE. The node list for the neighboring cells is obtained. The node list includes a cell identifier (cell ID) and at least one of the RNAI and the NNI for each neighboring cell. Therefore, the RN can select the cell to which it will access as the RN.

Figure 13:
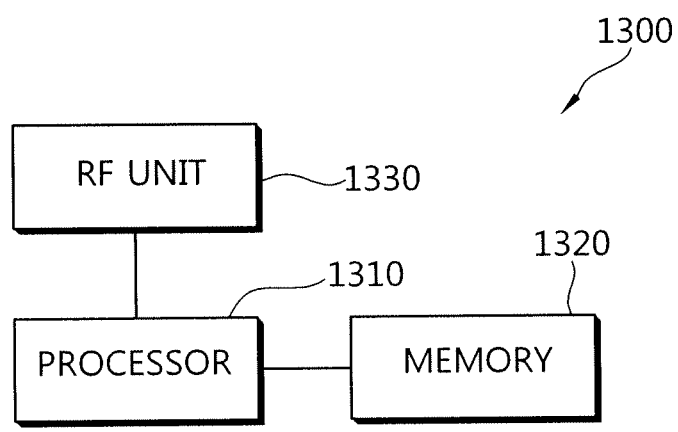
FIG. 13 is a block diagram showing a wireless device implementing the exemplary embodiments of the present invention.

FIG. 13 is a block diagram showing a wireless device implementing the exemplary embodiments of the present invention. A wireless device 1300 may be one of a UE, a RN, and a BS.

The wireless device 1300 includes a processor 1310, a memory 1320, and a radio frequency (RF) unit 1330. The memory 1320 stores a radio interface protocol and the radio interface protocol may be implemented by the processor 1310. The RF unit 1330 operatively connected to the processor 1310 transmits and/or receives radio signals.

When the wireless device 1300 is a part of a RN, the processor 1310 may implement the operation of the RN in the foregoing embodiments of FIGS. 8 to 12. When the wireless device 1300 is a part of a UE, the processor 1310 may implement the operation of the UE in the foregoing embodiments of FIGS. 8 to 12. When the wireless device 1300 is a part of a BS, the processor 1710 may implement the operation of the BS in the foregoing embodiments of FIGS. 8 to 12.

The processor 1310 may include application-specific integrated circuit (ASIC), other chipset, logic circuit and/or data processing device. The memory 1320 may include read-only memory (ROM), random access memory (RAM), flash memory, memory card, storage medium and/or other storage device. The RF unit 1330 may include baseband circuitry to process radio frequency signals. When the embodiments are implemented in software, the techniques described herein can be implemented with modules (e.g., procedures, functions, and so on) that perform the functions described herein. The modules can be stored in memory 1320 and executed by processor 1310. The memory 1320 can be implemented within the processor 1310 or external to the processor 1310 in which case those can be communicatively coupled to the processor 1310 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method of accessing to a network node in a wireless communication system, comprising:
   receiving, by a relay node (RN), a network node list from a network, the network node list including information about at least one network node which is allowed to access;
   selecting, by the RN, a network node from the network node list; and
   connecting, by the RN, to the selected network node,
   wherein the network node list includes at least one relay node allow indicator (RNAI) and at least one network node indicator (NNI), each RNAI indicating whether each network node is allowed to access and each NNI indicating a type of the each network node, the type being a relay node or a base station;
   wherein the step of the selecting the network node includes:
   determining the each network node is allowed to access based on the at least one RNAI; and
   selecting the network node among the at least one allowed network node by comparing the type of each allowed network node based on the at least one NNI and a predetermined preference type.

2. The method of claim 1, wherein the each RNAI is transmitted in system information about the each network node.

3. The method of claim 1, wherein the each RNAI is periodically transmitted.

4. The method of claim 1, wherein the each NNI is transmitted in system information about the each network node.

5. The method of claim 1,
   wherein if the preference type is the base station, the network node is preferentially selected among at least one allowed network node of which type is base station, and
   wherein if the preference type is the relay node, the network node is preferentially selected among at least one allowed network node of which type is relay node.

6. The method of claim 1, further comprising:
   requesting, by the RN, transmission of the network node list.

7. A relay node in a wireless communication system, comprising:
   a radio frequency (RF) unit configured to transmit and receive radio signals; and
   a processor operatively coupled with the RF unit and configured for:
   receiving a network node list from a network, the network node list including information about at least one network node which is allowed to access, the network node list including at least one relay node allow indicator (RNAI) and at least one network node indicator (NNI), each RNAI indicating whether each network node is allowed to access and each NNI indicating a type of the each network node, the type being a relay node or a base station;

determining the each network node is allowed to access based on the at least one RNAI;

selecting a network node among the at least one allowed network node by comparing the type of each allowed network node based on the at least one NNI and a predetermined preference type; and connecting to the selected network node.

8. The relay node of claim 7, wherein the each RNAI is transmitted in system information about the each network node.

9. The relay node of claim 7, wherein the each RNAI is periodically transmitted.

10. The relay node of claim 7, wherein the each NNI is transmitted in system information about the each network node.

11. The relay node of claim 7, wherein if the preference type is the base station, the network node is preferentially selected among at least one allowed network node of which type is base station, and wherein if the preference type is the relay node, the network node is preferentially selected among at least one allowed network node of which type is relay node.

12. The relay node of claim 7, wherein the processor is configured for:

requesting transmission of the network node list.

* * * * *